Patented Mar. 11, 1941

2,234,829

UNITED STATES PATENT OFFICE 2,234,829

LAMINATED GLASS

Harry T. Neher and Charles F. Woodward, Bristol, Pa., assignors to Röhm & Haas Company, Philadelphia, Pa.

No Drawing. Application September 16, 1939, Serial No. 295,252

6 Claims. (Cl. 49—92)

This invention relates to the preparation of a clear laminated glass of high impact strength over a wide temperature range. More particularly it relates to the preparation of laminated glass having as the intermediate strengthening layer a copolymer of vinyl alcohol and an ester of acrylic or methacrylic acid.

It is known that polymeric acrylic esters, methacrylic esters, vinyl esters, vinyl acetals, and other polymerized materials may be used as the intermediate layer of laminated glass. Of the various polymeric materials that have been proposed for this purpose the polyvinyl acetals and the acrylic and methacrylic esters are by far the best and are the only polymerized materials being commercially used. Neither of these classes, however, possesses all the desirable properties of the ideal interlayer. The polyvinyl acetals have high impact strength over a wide temperature range but lack the crystal clarity necessary for the best laminated glass. An automobile windshield made with a polyvinyl acetal has a haziness which at night diffuses the light of oncoming headlights and makes night-time driving a strain on the eyesight. The acrylic and methacrylic esters, on the other hand, can be made crystal clear but do not have as wide a temperature range as the polyvinyl acetals.

The object of this invention is to provide a laminated glass having the crystal clarity and other qualities of laminated glass made from acrylic or methacrylic ester polymers and the wide temperature range of high impact strength that is characteristic of laminated glass made with the polyvinyl acetals.

This object has been accomplished through the discovery that copolymers of polyvinyl alcohol and acrylic or methacrylic esters, wherein the polyvinyl alcohol is present in relatively small amounts, impart substantially greater impact strength to laminated glass than the pure acrylic resin polymers. Furthermore, this result is obtained when they are used in such small amounts that the water resistance, crystal clarity, and other qualities of the acrylic resins are in no way impaired. As little as 1% by weight of polyvinyl alcohol groups in the copolymer markedly extends the temperature range of high impact strength. We prefer to use copolymers containing from 1.5% to 5% polyvinyl alcohol groups and satisfactory results are obtained with amounts up to about 15%. With greater quantities the effect of the polyvinyl alcohol upon the other properties of the acrylic resins begins to be noticeable.

The improvement in impact strength over a wide temperature range is imparted by the polyvinyl alcohol to all the acrylic and methacrylic ester polymers that are used for laminated glass as well as to the copolymers of those esters with each other and with other polymerizable organic compounds. The lower alkyl esters of those acids such as the methyl, ethyl, propyl, and butyl, are the ones most commonly used. In some instances a copolymer containing a lower and a higher alkyl ester is desirable, but the effects of using the softer higher alkyl esters are usually more efficiently obtained through the use of plasticizers. Since vinyl alcohol does not exist in the monomeric state the copolymers used in the present invention cannot be made by direct polymerization. They may, however, be readily obtained by copolymerizing a vinyl ester such as vinyl acetate with an acrylic or methacrylic ester and then hydrolyzing the resulting polymer under such condition that only the vinyl ester groups are split. Methods of so controlling the hydrolysis of vinyl ester-acrylic or methacrylic ester copolymers are described in detail in copending applications Serial Nos. 278,898 and 278,899 filed June 13, 1939. In Serial No. 278,898 it is shown that the vinyl ester-methacrylic ester copolymers may be converted to vinyl alcohol-methacrylic ester copolymers by dissolving the former in a water miscible organic solvent, adding a small amount of water and a strong base, and heating to from 60 to 100° C. This treatment when applied to vinyl ester-methacrylic ester copolymers will hydrolyze the vinyl ester groups only. Were it applied to a copolymer containing an acrylic ester the acrylic ester groups would be hydrolyzed along with the vinyl ester groups and consequently, when such copolymers are used additional precautions must be taken. In Serial No. 278,899 it is shown that by subjecting either a vinyl ester-acrylic ester copolymer or a vinyl ester-methacrylic ester copolymer to an alcoholysis in the presence of an alcohol corresponding to the alcohol group of the acrylic or methacrylic ester, all the vinyl ester groups can readily be converted to vinyl alcohol groups without disturbing the acrylic or methacrylic ester groups. In practicing the present invention either of these methods or any other suitable one may be used in preparing the vinyl alcohol-acrylic or methacrylic ester copolymers.

In the preparation of the laminated glass either of the two general methods now commercially used may be employed, i. e. either the so-called "liquid film" method described in detail in U. S.

patents, 2,040,238 and 2,052,545, or the "dry film" method which consists in pressing a preformed dried sheet of plastic between two sheets of glass, the surfaces of which may be either treated with an adhesive substance or with a plasticizer adapted to soften and render adhesive the surfaces of the plastic sheet. In the examples that follow the former of these methods is used to illustrate the invention but wherever it is desirable to use the dry film method, the plastic compositions described may be calendered into sheets and sandwiched between sheets of glass by the conventional procedure.

*Example 1.*—A mixture of 1800 parts of ethyl methacrylate, 600 parts of vinyl acetate, and 1 part of benzoyl peroxide was added over a two-hour period to a refluxing mixture of 1920 parts of tertiary butanol and 480 parts of the mono ethyl ether of ethylene glycol. Five hours, and again eighteen hours, after completion of the monomer addition, 0.4 part of benzoyl peroxide were added. After a total of twenty-four hours' heating, the viscous, colorless solution was diluted with an equal volume of acetone. Water was then added while the solution was vigorously agitated. It gradually thickened until after about 1600 parts of water had been added it reached a highly viscous, non-adhesive stage. Further addition of 200 parts of water broke the dough-like mass and precipitated the polymer as small granules which were readily filtered from the homogeneous liquid phase containing the water, solvent, and unpolymerized monomer. The granules were washed with water and dried thoroughly, giving 1800 parts of dried polymer. Analysis showed that it contained 11.5% vinyl acetate. It was dissolved in four times its weight constant boiling (91%) isopropanol and warmed to 80° C. 4N-sodium hydroxide was then added in excess of the amount necessary to hydrolyze all the vinyl acetate present. After one hour the solution was made acid by the addition of an amount of 4N-H₂SO₄ equivalent to the amount of sodium hydroxide used to hydrolyze the polymer. The polymer was then precipitated by the slow addition of water. It was filtered, washed, and dried. It was soluble in ethylene dichloride, acetone, ethyl acetate, and benzene. It was insoluble in ether and petroleum hydrocarbons. A film of the polymer prepared from ethylene dichloride solution was slightly cloudy, hard, and tough. A film containing 25% dibutyl sebacate as plasticizer was noticeably harder and tougher than a corresponding film of the unhydrolyzed polymer. A film of the hydrolyzed polymer showed excellent adhesion to glass, whereas the adhesion of the unhydrolyzed polymer was poor. The cloudiness observed in the polymer was eliminated by reprecipitating the polymer from an acetone solution. A solution of the reprecipitated hydrolyzed polymer was prepared by dissolving 37.8 parts of the polymer in 250 parts of ethylene dichloride containing 16.2 parts of dibutyl sebacate.

Two 12" x 12" sheets of photoglass, after being thoroughly cleaned and dried, were coated on one side of each with this solution and the solvent evaporated first at room temperature and then at 80° C. in a drying oven. When thoroughly dried, the coated side of each sheet was wet with dibutyl sebacate and the two brought together with the film sides adjacent. They were then run between rubber rolls to thoroughly contact the two film surfaces and to remove excess contacting agent. Any trapped air bubbles were squeezed out along with the excess contacting agent. The sandwich which was already well united was returned to the oven and kept at 80° C. for one hour. The thickness of the intermediate layer was 0.021". The laminated sheet was generally clear and colorless. To test its impact strength, one sheet so prepared was cut into sixteen 3" x 3" test pieces. Eight of these were immersed in a constant temperature water bath at 120° F. and the other eight in an ice-salt mixture at 10° F. After one-half hour in these baths the pieces were impact tested by placing them on a hollow square iron support of 3" x 3" outside dimensions and 2½" x 2½" inside dimensions and allowing steel balls of ¼ and ½ pound weight to drop upon the center of the test piece from a measured height. The height from which the ball dropped was gradually increased with each test until the ball penetrated the test piece or broke it into two or more separate pieces. The maximum height from which a given set of test pieces will withstand the impact of the ball without being penetrated or broken into separate pieces is herein called the "critical distance." This test on the 3" x 3" test pieces gave the following critical distances—

Feet
¼ pound ball at 10° F_____ 8
½ pound ball at 120° F_____ 8

The adhesion of the film to the glass was examined and found to be excellent.

Laminated photoglass prepared in a similar manner from a solution of the unhydrolyzed polymer and tested in a similar manner showed the following critical distances—

Feet
¼ pound ball at 10° F_____ 4½
½ pound ball at 120° F_____ 5

Considerable glass was separated from the film as a result of the impact and indicated poor adhesion of the film to the glass. For comparative purposes similar 3" x 3" test pieces were prepared from polyethyl methacrylate, plasticized with dibutyl sebacate (40.5 parts of polymer and 13.5 parts dibutyl sebacate.) The critical distances for these pieces were found to be—

Feet
¼ pound ball at 10° F_____ 5
½ pound ball at 120° F_____ 6

Additional samples of laminated photoglass prepared in accordance with this example were submitted to the standard impact test to measure the temperature range of impact resistance. This test consists in measuring the temperature at which 12" x 12" pieces of laminated glass fail when a ½ pound steel ball is dropped upon them from a distance of 16 feet or a two-pound steel ball from a distance of four feet. This test showed laminated glass made in accordance with this example had a temperature range of high impact resistance of from 0° to 120° F. as compared with a temperature range of from 20 to 120° F. for laminated glass made with a commercial methacrylate resin, and from about 45 to 120° F. for laminated glass made with cellulose acetate.

*Example 2.*—A vinyl acetate-ethyl methacrylate copolymer prepared as described in Example 1 was subjected to alcoholysis in the following manner. 250 parts of the dried polymer was dissolved in 1000 parts dry acetone, 5 parts of sodium was dissolved in 150 parts of anhydrous ethanol and the solution mixed with the polymer solution. Within fifteen minutes after the addition of the sodium ethoxide solution, the mixture had set to a rubber-like gel. After fifteen hours at room temperature the gel was broken up and thoroughly stirred with 300 parts of water containing thirty parts acetic acid. The shreds of polymer were washed well with fresh water and finally dried in an oven at 70° C. The dried polymer amounted to 226 parts. A solution containing 37.8 parts of the dried polymer and 16.2 parts of dibutyl sebacate in 250 parts of ethylene dichloride was used in the preparation of laminated photoglass by the method described in Example 1. The critical distance for impact tests on 3" x 3" samples of the laminated glass produced was found to be—

| | Feet |
|---|---|
| ¼ pound ball at 10° F | 7 |
| ½ pound ball at 120° F | 8 |

*Example 3.*—Eighteen parts of the ethyl methacrylate-vinyl acetate copolymer prepared in accordance with Example 1 was dissolved in 64 parts of constant boiling 91% isopropanol. The solution was heated to gentle reflux with stirring and 2.7 parts concentrated sulphuric acid in 3.5 parts water were added. Stirring was discontinued as soon as the mixture was homogeneous and the solution was kept at gentle reflux (81-83° C.) for 24 hours. The hydrolyzed polymer was precipitated from the hot solution by the slow addition of water with vigorous agitation, filtered, washed, and dried. It was reprecipitated from isopropanol to remove traces of acid. The dried, reprecipitated polymer amounted to sixteen parts. It was soluble in acetone, ethyl acetate, ethylene dichloride, benzene, and toluene. Films prepared from solutions of the polymer were clear, colorless and were tougher than films of the unhydrolyzed polymer. The polymer was dissolved in 110 parts of ethylene dichloride by heating and stirring the mixture for thirty minutes. The hot solution was filtered through a pad consisting of ½" well-packed layer of diatomaceous earth supported on a cloth. The filtered solution was analyzed for polymer and enough dibutyl sebacate was added to correspond to 27% plasticizer, based on the total non-volatile matter. It was then concentrated under slightly reduced pressure until the non-volatile matter reached 30% concentration. The solution was sparkling clear and gave films which were free from all haze or dirt contamination. A 12" x 12" sheet of laminated photoglass was prepared from 180 grams of the above solution by the method used in Example 1. The laminated sheet was also free from all haze or dirt contamination. The critical distance for impact tests on 3" x 3" test pieces was found to be—

| | Feet |
|---|---|
| ¼ pound ball at 10° F | 7 |
| ½ pound ball at 120° F | 7 |

The adhesion of the film to the glass was excellent. The standard impact test for temperature range using 12" x 12" test pieces showed a temperature range of high impact resistance from 0° to 115° F.

*Example 4.*—A mixture of 2040 parts of ethyl methacrylate, 260 parts of vinyl acetate, 1.2 parts of benzoyl peroxide was added over a two-hour period to 2400 parts 95% ethyl alcohol. Five hours after the addition was completed, 0.5 part of benzoyl peroxide were added and the heating continued for a total of twenty hours. The very viscous, colorless mass was diluted with 3600 parts of acetone and the polymer precipitated from the solvent and unpolymerized monomer by the addition of water as described in Example 1. Analysis of the polymer showed it contained 5.7% vinyl acetate.

A solution of 1800 parts of the above dried polymer in 4600 parts of constant boiling 91% isopropanol was heated to gentle reflux with stirring and enough 4N-NaOH added to hydrolyze the vinyl acetate in an amount equal to 2% of polymer. The solution was kept at from 80–82° C. for one-half hour, after which it was only faintly alkaline. The hot solution was stirred vigorously while 6500 parts of water were slowly added. The mixture thickened and then dispersed again to give a fluid, stable, colloidal suspension. The addition of 80% glacial acetic acid in eighty parts of water broke the suspension and the polymer precipitated as fine granules. The polymer was removed by filtration, washed by suspension in 4000 parts of water and then filtered and dried. Films prepared from an ethylene dichloride solution of the polymer were clear and colorless. They were tougher and harder than films of the unhydrolyzed polymer.

A solution of the hydrolyzed polymer in ethylene dichloride was prepared, filtered and plasticized exactly as described in Example 3. Laminated photoglass prepared from this solution by the method described in Example 1 was clear, colorless, free from all haze and dirt contamination. The critical distance for impact test on 3" x 3" test pieces was found to be—

| | Feet |
|---|---|
| ¼ pound ball at 10° F | 9 |
| ½ pound ball at 120° F | 6 |

The adhesion of the films to the glass was excellent. The critical distance for impact test on 3" x 3" test pieces prepared similarly from an unhydrolyzed polymer was—

| | Feet |
|---|---|
| ¼ pound ball at 10° F | 5 |
| ½ pound ball at 120° F | 5 |

12" x 12" test pieces when measured for temperature range of high impact resistance showed a range of from 0° to 120° F.

*Example 5.*—A mixture of 85 parts of methyl acrylate and 15 parts of vinyl acetate containing 0.05% benzoyl peroxide was refluxed with 100 parts of benzene for twenty hours. The polymer was isolated by steam distilling the mixture until all solvent and monomer had been removed. It was then subjected to alcoholysis according to the procedure described in Example 2. Laminated photoglass was prepared from a solution of 51.3 grams of the polymer and 2.7 grams of dibutyl sebacate and 250 grams ethylene dichloride. The critical distance for impact tests on 3" x 3" samples was—

| | Feet |
|---|---|
| ¼ pound ball at 10° F | 7 |
| ½ pound ball at 120° F | 5 |

The adhesion of the film to the glass was excellent.

The particular advantages offered by the laminated glass prepared from vinyl alcohol and acrylic or methacrylic ester copolymers are their high resistance to impact over a wide temperature range, particularly at low temperatures, excellent adhesion of the film to the glass, the stability of the polymer films to heat and light, and their excellent clarity when due precautions are taken to eliminate foreign particle contamination. While a wide variety of copolymers using different acrylic or methacrylic esters may be used, we have found that in general the best results are obtained with the copolymers of vinyl alcohol and ethyl methacrylate. We have also found that dibutyl sebacate is a particularly effective plasticizer and a good contacting agent. Other plasticizers such as the lower alkyl esters of phthalic acid, tartaric acid, lactic acid, sebacic acid, citric acid, o-phosphoric acid, and boric acid, and also benzyl benzoate, triethylene glycol dihexoate, diethylene glycol di-isobutyrate butyl carbitol acetate, butyl laevulinate, and triacetin also give excellent results.

Instead of uniting two sheets of glass to an intermediate film of vinyl alcohol-acrylic or methacrylic ester copolymer, a shatterproof structure may be formed by coating a single glass sheet on one side with the copolymer, or three or more sheets of glass may be combined by alternate films of copolymer. If desired, one or more of the glass sheets may be replaced by other solid transparent materials such as sheets of polymeric methyl methacrylate, or other transparent resin. If a colored or opaque shatterproof structure is desired, coloring materials or opacifiers may be added to the polymer. Other similar variations which may be desired for particular uses may be made.

We claim:

1. Shatterproof glass comprising at least one sheet of glass and a strengthening layer of a copolymer of vinyl alcohol and at least one member of the group consisting of acrylic and methacrylic esters, said copolymer containing from 1 to 15% by weight of polyvinyl alcohol groups.

2. Shatterproof glass comprising at least one sheet of glass and a strengthening layer of a copolymer of vinyl alcohol and a methacrylic ester containing from 1 to 15% by weight of polyvinyl alcohol groups.

3. Shatterproof glass comprising at least one sheet of glass and a strengthening layer of a copolymer of vinyl alcohol and a lower alkyl ester of methacrylic acid, said copolymer containing from 1 to 15% by weight of polyvinyl alcohol groups.

4. Shatterproof glass comprising at least one sheet of glass and a strengthening layer of a copolymer of vinyl alcohol and ethyl methacrylate containing from 1 to 15% by weight of polyvinyl alcohol groups.

5. Shatterproof glass comprising two sheets of glass and an intermediate layer of a copolymer of vinyl alcohol and a lower alkyl ester of methacrylic acid, said copolymer containing from 1.5 to 5% by weight of polyvinyl alcohol groups.

6. Shatterproof glass comprising two sheets of glass and an intermediate layer of a copolymer of vinyl alcohol and ethyl methacrylate plasticized with dibutyl sebacate, said copolymer containing from 1.5 to 5% by weight of polyvinyl alcohol groups.

HARRY T. NEHER.
CHARLES F. WOODWARD.